UNITED STATES PATENT OFFICE.

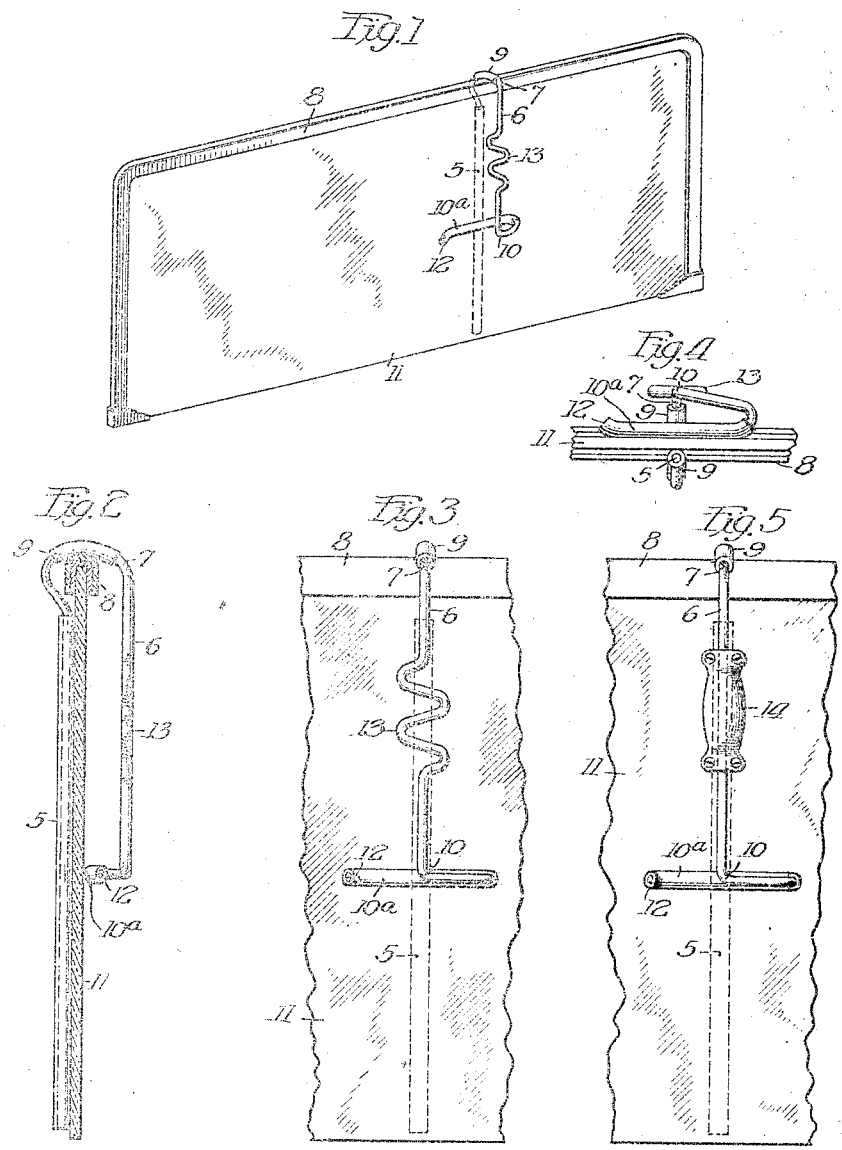

OLIVER C. RITZ-WOLLER, OF CHICAGO, ILLINOIS.

WINDSHIELD-CLEANER FOR AUTOMOBILES.

1,351,218.

Specification of Letters Patent.

Patented Aug. 31, 1920.

Application filed November 30, 1917. Serial No. 204,577.

*To all whom it may concern:*

Be it known that I, OLIVER C. RITZ-WOLLER, a citizen of the United States, residing at Chicago, in the county of Cook and State of Illinois, have invented a certain new and useful Improvement in Windshield-Cleaners for Automobiles, of which the following is a full, clear, concise, and exact description.

This invention relates to window cleaners and while of more or less general application, it relates more particularly to window cleaners of the type adapted for use in connection with automobile windshields and the like, and is designed primarily to provide means whereby the drivers of automobiles and like vehicles may easily and quickly remove frosting or moisture from the glass of the windshield, thereby enabling them to maintain a clear vision at all times.

Among the objects of the present invention are—to provide a device of the class described which is simple in construction and operation and economical to manufacture; one which may be readily and quickly applied to windshields of various sizes and forms of construction; one which is easily adjustable; one which, when applied to a windshield, may be moved from one side to the other thereof with rapidity and ease to effectively clean the glass or other transparent medium of which the same may be made; one which comprises means whereby a firm grip may be had in manipulating the device, and one wherein means is provided for effectively preventing rocking of the device or other accidental displacement thereof during manipulation.

Other objects and advantages will be apparent from the following description taken in connection with the accompanying drawings wherein two forms of the invention are illustrated.

In the accompanying drawings,

Figure 1 is a perspective view illustrating the device applied to a windshield.

Fig. 2 is a cross sectional view through a windshield showing the device in side elevation.

Fig. 3 is a front elevation.

Fig. 4 is a bottom plan view, and

Fig. 5 is a front elevation of a slightly modified form of the invention.

Referring more in detail to the drawings, the device is shown as comprising a single rod or heavy wire of resilient material, preferably metal, which is bent intermediate its ends to form a wiper arm 5, a handle 6 and a supporting or connecting member 7 which is adapted to rest on the top horizontal cross member 8 of the frame of the windshield when the device is in operative position and to slide back and forth thereon when the device is manipulated. This supporting member 7 is provided with a suitable covering 9 which may be of rubber, fabric, leather or any other suitable material in order to prevent marring or scratching of the frame 8 of the windshield when the device is moved back and forth in contact therewith.

At the lower end of the handle 6, the rod is bent inwardly as shown at 10 to provide a preferably rigid and substantially horizontal contact shoe $10^a$, which is adapted to bear against the inner surface of the glass 11 of the windshield, said shoe providing a continuous contact with said glass of considerable length by virtue of its extension on both sides of said handle, as shown in the drawings. The shoe $10^a$ provides means whereby the cleaner is held against accidental displacement during manipulation thereof, and is particularly designed to prevent the device from rocking when the same is moved from side to side. The outer end of the shoe $10^a$ is curved slightly outwardly as shown at 12 in order that it may readily slide over the glass.

The handle 6, which is substantially parallel to the wiper arm 5 and to the windshield 11 when the device is in operative position, is bent intermediate the supporting member 7 and the shoe $10^a$ into substantially zig-zag form as shown at 13 in order to enable the operator to secure a firm grip on the device when it is desired to manipulate it. This formation of the handle, it will be noted, also prevents slipping of the hand during manipulation.

The wiper arm 5 and the shoe $10^a$ are also covered with tubing of rubber or other suitable material for obvious reasons, it being preferred to cement or otherwise securely fasten the tubing to these two members in order to prevent displacement thereof during manipulation.

As above stated, the device is preferably made of a single piece of resilient material, the same being bent to shape, as above described. Normally, when the device is not in operative position, the shoe $10^a$ presses firmly against the wiper arm 5 due to the resiliency of the device, which resiliency also permits the device to be sprung sufficiently to enable it to be placed over the top of the shield and moved down into the position shown in the drawings, in which position it is held against accidental displacement by the pressure exerted against opposite sides of the glass by the shoe 10ª and the wiper arm 5. The device may be readily moved, however, back and forth from one side of the shield to the other with comparative ease after it has been positioned.

It will be noted that the shoe 10ª retains the handle 6 spaced away from the glass a sufficient distance to enable the operator to pass his hand between it and the glass and to conveniently grasp the handle when it is desired to clean the shield. While the zig-zag curvature of the handle is shown disposed in a plane substantially parallel to the shield, it is not desired to limit the device to this particular arrangement.

From the construction of the device, as above set out, it will be noted that if desired, the wiper 5 may be swung or oscillated over the glass in much the same manner as that in which the pivoted cleaners, now common in the art, are operated instead of moving the same back and forth, as above described. When it is desired to thus swing the wiper arm 5 over the glass instead of moving it back and forth thereover, the supporting member 7 is held substantially stationary and the handle moved to oscillate the wiper over the glass about said member 7 as a pivot. Regardless of the manner in which the device is manipulated, it will be noted that the shoe 10ª with its long line contact with the glass acts to effectively prevent rocking of the device or other accidental displacement thereof.

In Fig. 5 a slightly modified form of cleaner is illustrated. In this embodiment of the invention, the handle 6 is made of substantially straight line construction, the zig-zag formation being dispensed with and a suitable hand grip 14 provided which may be of wood, rubber or any other suitable material.

It is not desired to limit the invention illustrated and described herein except where limitations appear in the appended claim.

Having thus described my invention, what I claim as new and desire to secure by Letters Patent of the United States is:—

A device of the class described, comprising a supporting member adapted to slidably contact with the edge of a windshield, a wiper arm adapted to engage the outer surface of said shield, a handle disposed on the inner side of said shield, and a shoe integral with said handle and disposed at substantially right angles thereto and to said wiper arm, said shoe being adapted to contact with the inner surface of said shield to prevent said device from rocking during manipulation and to retain said handle spaced from said shield.

In witness whereof I hereunto subscribe my name this 28th day of November A. D. 1917.

OLIVER C. RITZ-WOLLER.